Feb. 4, 1958 R. A. GOEPFRICH ET AL 2,822,065
BRAKE ASSEMBLY
Filed Aug. 31, 1949 2 Sheets-Sheet 1

INVENTOR.
BRYAN E. HOUSE
RUDOLPH A. GOEPFRICH
BY
T. J. Plante
ATTORNEY

INVENTOR.
BRYAN E. HOUSE
RUDOLPH A. GOEPFRICH
BY
ATTORNEY

United States Patent Office 2,822,065
Patented Feb. 4, 1958

2,822,065

BRAKE ASSEMBLY

Rudolph A. Goepfrich, South Bend, Ind., and Bryan E. House, Ashtabula, Ohio, assignors to Bendix Aviation Corporation, South Bend, Ind., a corporation of Delaware Application August 31, 1949, Serial No. 113,456

20 Claims. (Cl. 188—78)

This invention relates to an improved brake assembly of the internal-expanding-shoe type.

The primary object of the invention is to provide at a minimum manufacturing cost, a brake assembly which is outstanding both in its operating characteristics and in its structural strength.

In general, the foregoing object is obtained by utilizing, in addition to a backing plate which carries two hydraulic wheel cylinders, two torque-taking members which transmit the anchoring torque of the shoes directly to a non-rotating part of the vehicle (or other device in connection with which the brake is used). The torque-taking members are mounted between the wheel cylinders and the axis of the brake assembly, and have spaced outwardly-extending projections which serve as anchors for the shoes.

Certain features of our improved brake assembly are: (1) the use of an adjusting screw in one anchoring projection of each torque-taking member; (2) the use of plano-convex thrust-transmitting members between the anchoring projections and the ends of the shoes which anchor in the forward direction; and (3) the use of four shoe-return springs which urge the shoe ends toward the respective anchoring surfaces.

Figures 1, 2:
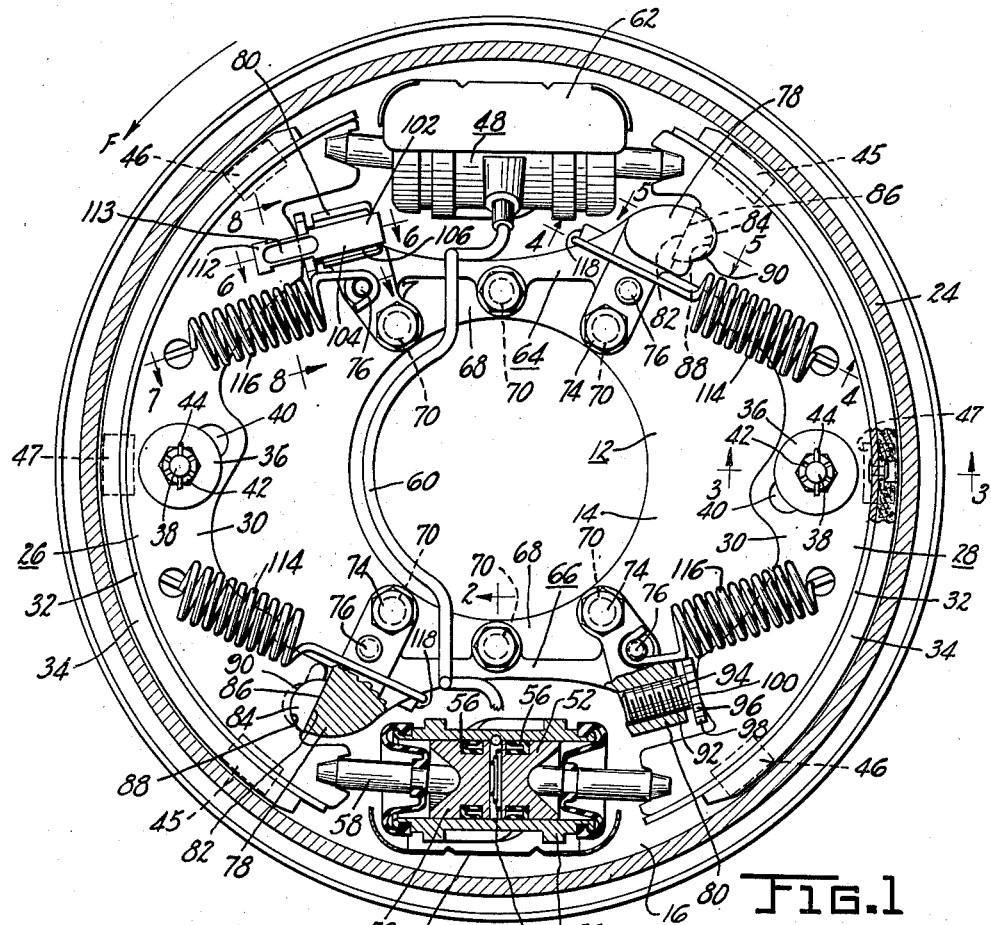
Figure 3:
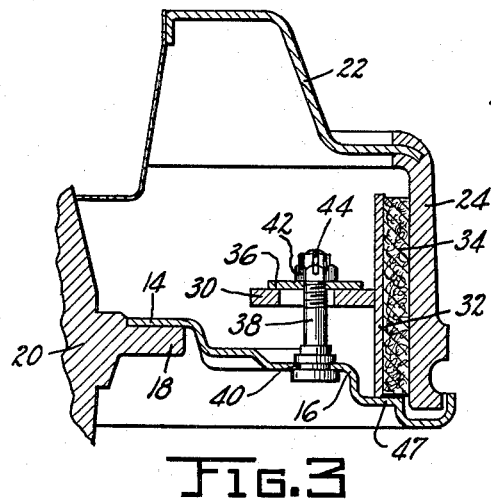
Figure 4:
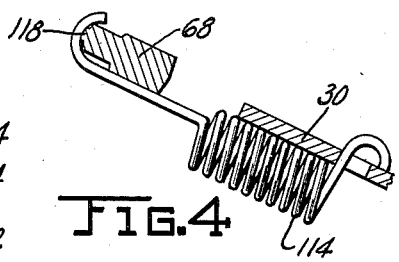
Figure 5:
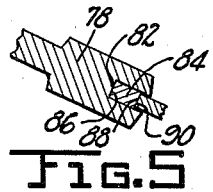
Figure 6:
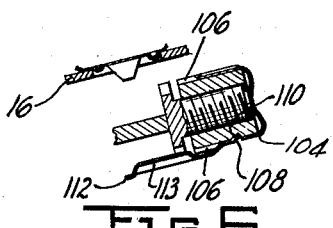
Figure 7:
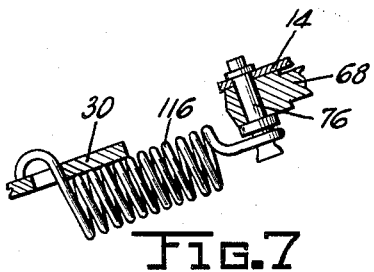
Figure 8:
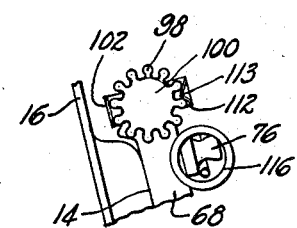

Other objects and advantageous features of the present invention will become apparent during the following description of an illustrative embodiment of the invention, reference being had therein to the accompanying drawings, in which:

Figure 1 is an elevational view of a brake assembly which embodies the invention; and Figures 2, 3, 4, 5, 6, 7 and 8 are sections taken on the lines 2—2, 3—3, 4—4, 5—5, 6—6, 7—7, and 8—8, respectively, of Figure 1.

Referring to the drawings, our improved brake assembly includes a backing plate 12 which has a flat annular center portion 14 and an axially-offset outer portion 16. The center portion 14 of the backing plate is mounted against, and secured to, a flange 18 provided on a non-rotating member, such as the axle housing 20 of an automotive vehicle. The outer portion 16 of the backing plate serves as a carrier, or mounting plate, for the brake shoes and wheel cylinders, and also serves as a cover for the open side of the brake drum, which consists of a disk 22, and a braking flange 24.

Two arcuate, oppositely-disposed brake shoes 26 and 28 are mounted on the outer portion of the backing plate. Each of the shoes is T-shaped in cross-section, and comprises a web 30, a rim 32, and lining 34 secured to the rim. Each of the shoes is guided laterally between the backing plate and a washer 36 carried by a post 38, which is secured to the backing plate and which extends through an over-sized opening 40 provided in the shoe web. The end of post 38 remote from the backing plate is threaded, and a castellated nut 42 is screwed onto the post to adjust the lateral position of washer 36. When the washer is in the proper position, the nut is locked in place by means of a cotter pin 44. The rim of each shoe is guided by two ledges 45 and 46 formed on the backing plate near the ends of the shoe. A third backing plate ledge 47, located midway between ledges 45 and 46, is slightly lower than the end ledges. Owing to the fact that the lines of force of the shoe return springs are laterally offset from the plane of the shoe webs, the springs tend to hold the mid-length portion of each shoe web against the washer 36, while the shoe rim remains in engagement with the two backing plate ledges 45 and 46 located near its ends. Each center ledge 47, which is lower than the end ledges by a predetermined amount, serves as a gauge point for initial lateral adjustment of the shoe. By inserting a feeler of suitable thickness between ledge 47 and the shoe rim and turning nut 42 until washer 36 engages the shoe web, proper lateral adjustment is obtained.

Two hydraulic wheel cylinders 48 and 50 are located between the ends of the shoes at diametrically opposite positions in the brake assembly, and are secured to the outer portion 16 of the backing plate. Each of the hydraulic cylinders has a pair of pistons 52 reciprocably mounted in the bore of the cylinder and urged apart by a light spring 54. The pistons carry annular seals 56, and their outer ends are in operative engagement with the adjacent shoe ends through the intermediary of thrust rods 58. The wheel cylinders 48 and 50 are interconnected by a conduit 60, and one of the wheel cylinders is connected by a suitable conduit (not shown) to a hydraulic pressure source, such as a conventional master cylinder. In order to protect the hydraulic fluid in the wheel cylinders, as well as the rubber seals and boots, from the heat developed during braking, sheet metal shields 62 may be placed between the wheel cylinders and the surface of drum flange 24.

Wheel cylinders 48 and 50 do not take the anchoring torque of the brake shoes; therefore, their design is simplified and their manufacturing cost is reduced. The fastening members used to secure the wheel cylinders to the outer portion of the backing plate are only required to support the weight of the cylinders.

In order to take the anchoring load of the shoes, two oppositely-disposed torque-taking members 64 and 66 are provided, each of which is located radially between one of the hydraulic wheel cylinders and the center of the brake assembly. Each of said torque-taking members, which we prefer to form by forging (for maximum torque-absorbing strength), has a substantially arcuate radially-inner flat portion 68 which lies against the center portion 14 of the backing plate. In order to avoid offset anchor loading, we prefer that the axes of the hydraulic cylinders and the webs of the brake shoes lie in the plane of the inner portions 68 of the torque-taking members.

The inner portion of each torque-taking member has three mounting holes 70 which are aligned with mounting holes 72 provided in the inner portion 14 of the backing plate, in order that the torque-taking members and the backing plate may be secured to the supporting flange 18 by the same bolts 74. In order to retain the torque-taking members in assembled position on the backing plate prior to mounting the brake assembly on the flange 18, two fastening members (illustrated as rivets 76) are used to secure the torque-taking members to the backing plate independently of the bolts 74.

Each of the torque-taking members has at its angularly-spaced ends two integral substantially radial projections 78 and 80, which extend outwardly to, in effect, "straddle" longitudinally the respective hydraulic cylinder (i. e. straddle the cylinder in a plane parallel to its axis) and provide anchoring surfaces for the ends of the shoes. The anchor projection 78 of each torque-taking member has a substantially radial slot 82 formed therein. A plano-convex thrust member 84 is slidably mounted in each slot, and has a flat surface 86 engaging the bottom of the slot, and a convexly-curved surface 88 which fits into a complementary concave recess 90 formed on the end of the shoe.

The plano-convex thrust members 84 reduce wear on the ends of the shoes, and make it unnecessary to harden the ends of the shoes. The arrow F in Figure 1 indicates the direction of drum rotation when the vehicle is moving in the forward direction. Most of the heavy shoe-anchoring loads are taken by the anchor projections 78, because they anchor the shoes in the forward direction. If the ends of the shoes were provided with convexly curved surfaces which directly engaged the anchor surfaces 82, the heavy anchor loads would eventually flatten the shoe ends, eliminating their ability to rotate during application, and even tending to cause the shoes to "stick" in the slots. Use of the plano-convex thrust members 84 avoids the "spreading" tendency of the shoe ends, because the amount of anchor-engaging surface of the shoes is greatly increased (i. e. it is increased from line contact to surface contact over the full area of the curved recess 90). The shoe ends do not have to be hardened, both because of the reduction in wear, and because wear cannot affect the pivotal movement of the shoes. It is a relatively simple matter to harden the thrust members 84. The anchor surfaces of projections 78 should also be hardened.

The anchor projection 80 of each torque-taking member has a threaded opening 92 formed therein, which receives the stem 94 of an adjusting screw 96. The head of each adjusting screw has a serrated periphery 98, and a flat top surface 100 which constitutes an anchoring and locating surface for the adjacent end of the respective shoe. Each shoes is adjusted, in order to compensate for lining wear, by using a suitable tool to pry the serrated periphery 98 of the adjusting screw head, thereby rotating the adjusting screw to move the shoe closer to the drum.

In order to retain each adjusting screw in adjusted position, a resilient locking member 102 is provided. Locking member 102 is a spring steel member having a U-shaped portion 104 which is clamped over the back of the anchor projection 80 and which is retained in position between ridges 106 formed on said projection. One side of the U-shaped portion of member 102 has a tooth 108 which is adapted to lock in a depression 110 provided in the anchor projection, in order to hold member 102 in assembled position in the brake. An arm 112 extends outwardly from one side of member 102 to engage resiliently the teeth formed on the periphery of the adjusting screw head, the arm having a raised portion 113 which provides a detent for the adjusting screw teeth.

Each brake shoe is urged toward released position by two return springs 114 and 116. We prefer to make the springs 114 stronger than the springs 116, in order to insure that the ends of the shoes which anchor during braking in the forward direction remain anchored until the other ends of the shoes have engaged the drum. In this way, shifting of the shoes from one anchor to the other is avoided as long as the braking is done with the vehicle moving in the forward direction. The only shifting of the shoes from one anchor position to the other occurs during braking when the vehicle is moving backward. In order to avoid errors in assembling the springs, the heavier springs 114 are connected to nibs 118 formed on the torque-taking members, whereas the lighter springs 116 are connected to the fastening members 76.

Operation of our improved brake assembly is believed to be obvious from the foregoing description. However, a brief summary may be useful. When hydraulic fluid under pressure is admitted to the hydraulic cylinders 48 and 50 from the hydraulic pressure source, the pistons in the cylinders are urged outwardly, tending to bring the shoes into engagement with the braking flange 24 of the drum. As previously explained, the unbalanced arrangement of the two springs acting on each shoe causes the end of each shoe adjacent the adjusting screw to initially move into engagement with the drum. During this movement, the surface 90 of each shoe slides on the surface 88 of the corresponding thrust-transmitting member 84, causing a pivotal movement of the shoe into the drum. If the drum is rotating in the forward direction, the shoes will remain anchored on the thrust members 84 throughout the braking operation. If the drum is rotating in the opposite direction, the shoes will be moved by the drum to anchor against the surfaces 100 of the adjusting screws.

When the brake applying pressure is relieved, springs 114 and 116 will return the shoes to released position, in which both ends of both shoes are anchored. Whenever the position of the shoes is adjusted by rotating the adjusting screws, the pistons in the hydraulic cylinders are caused by the springs 54 and by the "head" of the fluid in the system to "follow" the shoes, drawing an additional amount of fluid from the master cylinder reservoir to fill the chambers between the pistons.

Both ends of both shoes are capable of pivotal movement and sliding movement with respect to their anchors. The normal movement of the shoes into engagement with the drum is pivotal. However, if the shoes are not concentric with the drum at the time of application, or if the shoes are not equally spaced from the drum at all points after adjustment, the shoes can slide with respect to the anchors to bring them into exact concentricity with the drum. During forward braking, sliding of the shoes is obtained by sliding thrust-members 84 along the surfaces 82. During rearward braking, the ends of the shoes slide on the surfaces 100 of the adjusting screws.

Although a particular embodiment of our invention has been described, it will be understood by those skilled in the art that the object of the invention may be obtained by the use of constructions different in certain respects from that disclosed without departing from the underlying principles of the invention.

We claim:

1. A brake, for use in cooperation with a rotatable drum, comprising a backing plate having a flat annular center portion and an axially offset outer portion, two arcuate oppositely-disposed brake shoes mounted on the outer portion of the backing plate, two hydraulic cylinders secured to the outer portion of the backing plate and located between the ends of the shoes at diametrically opposite positions in the brake assembly, each of said cylinders having a pair of pistons reciprocable therein, said pistons being in operative engagement with the adjacent ends of the shoes, two oppositely-disposed torque-taking members, each located radially between one of the hydraulic cylinders and the center of the brake assembly, each of said torque-making members having a substantially arcuate radially inner flat portion which lies against the center portion of the backing plate, the axes of the hydraulic cylinders being in the plane of the inner portions of the torque-taking members, the inner portion of each torque-taking member and the center portion of the backing plate having a plurality of aligned mounting holes by means of which the torque-taking members and the backing plate may be jointly secured to a non-rotating member, fastening means for securing each torque-taking member to the backing plate, each of said torque-taking members having angularly-spaced ends provided with substantially radial projections which extend outwardly to "straddle" longitudinally the respective hydraulic cylinder and provide anchoring surfaces for the ends of the shoes, one projection of each torque-taking member having a threaded opening therein and the other projection of each torque-taking member having a substantially radial slot formed therein, two adjusting screws having stems screwed into the respective threaded openings and having heads which provide anchoring and locating surfaces for the adjacent ends of the respective shoes, two plano-convex thrust members lying in the respective radial slots and having straight surfaces which engage the bottoms of the slots and convex surfaces which engage complementary recesses in the adjacent ends of the respective shoes, and four return springs, one spring acting on each end of each shoe to urge it toward anchored position, the two springs which tend to retain the respective shoe ends in engagement with the thrust members being arranged to exert greater force than the two springs which tend to retain the respective shoe ends in engagement with the adjusting screw heads.

2. A brake, for use in cooperation with a rotatable drum, comprising a backing plate having a flat annular center portion and an axially offset outer portion, two arcuate oppositely-disposed brake shoes mounted on the outer portion of the backing plate, two hydraulic cylinders secured to the outer portion of the backing plate and located between the ends of the shoes at diametrically opposite positions in the brake assembly, each of said cylinders having at least one piston reciprocable therein which is in operative engagement with one of the ends of the shoes, two oppositely-disposed torque-taking members, each located radially between one of the hydraulic cylinders and the center of the brake assembly, each of said torque-taking members having a substantially arcuate radially inner portion which lies against the center portion of the backing plate, the axes of the hydraulic cylinders being in the plane of the inner portions of the torque-taking members, the inner portion of each torque-taking member and the center portion of the backing plate having a plurality of aligned mounting holes by means of which the torque-taking members and the backing plate may be jointly secured to a non-rotating member, a fastening means for securing each torque-taking member to the backing plate, each of said torque-taking members having angularly-spaced ends provided with substantially radial projections which extend outwardly to "straddle" longitudinally the respective hydraulic cylinder and provide anchoring surfaces for the ends of the shoes, one projection of each torque-taking member having a threaded opening therein, two adjusting screws having stems screwed into the respective threaded openings and having heads which provide anchoring and locating surfaces for the adjacent ends of the respective shoes, and four return springs, one spring acting on each end of each shoe to urge it toward anchored position.

3. A brake, for use in cooperation with a rotatable drum, comprising a backing plate having a flat annular center portion and an axially offset outer portion, two arcuate oppositely-disposed brake shoes mounted on the outer portion of the backing plate, two hydraulic cylinders secured to the outer portion of the backing plate and located between the ends of the shoes at diametrically opposite positions in the brake assembly, each of said cylinders having a pair of pistons reciprocable therein, said pistons being in operative engagement with the adjacent ends of the shoes, two oppositely-disposed torque-taking members, each located radially between one of the hydraulic cylinders and the center of the brake assembly, each of said torque-taking members having a substantially arcuate radially inner portion which lies against the center portion of the backing plate, the inner portion of each torque-taking member and the center portion of the backing plate having a plurality of aligned mounting holes by means of which the torque-taking members and the backing plate may be jointly secured to a non-rotating member, fastening means for securing each torque-taking member to the backing plate, each of said torque-taking members having angularly-spaced ends provided with substantially radial projections which extend outwardly to "straddle" longitudinally the respective hydraulic cylinder and provide anchoring surfaces for the ends of the shoes, and four return springs, one spring acting on each end of each shoe to urge it toward anchored position.

4. A brake, for use in cooperation with a rotatable drum, comprising a backing plate having a flat annular center portion and an axially offset outer portion, two oppositely-disposed brake shoes mounted on the outer portion of the backing plate, two hydraulic cylinders secured to the outer portion of the backing plate and located between the ends of the shoes at diametrically opposite positions in the brake assembly, each of said cylinders having a pair of pistons reciprocable therein, said pistons being in operative engagement with the adjacent ends of the shoes, two oppositely-disposed torque-taking members, each located radially between one of the hydraulic cylinders and the center of the brake assembly, each of said torque-taking members having a radially inner portion which is attached directly to a non-rotating member, the inner portion of each torque-taking member and the center portion of the backing plate having a plurality of aligned mounting holes by means of which the torque-taking members and the backing plate may be jointly secured to a non-rotating member, each of said torque-taking members having angularly-spaced ends provided with projections which extend outwardly to "straddle" the respective hydraulic cylinder and provide anchoring surfaces for the ends of the shoes, and return springs which act on the shoes to tend to hold them in engagement with the anchoring surfaces.

5. A brake, for use in cooperation with a rotatable drum, comprising a backing plate having a center portion and an axially offset outer portion, two oppositely-disposed brake shoes mounted on the outer portion of the backing plate, two hydraulic cylinders secured to the outer portion of the backing plate and located between the ends of the shoes, each of said cylinders having a pair of pistons reciprocable therein, said pistons being in operative engagement with the adjacent ends of the shoes, two oppositely-disposed torque-taking members, each located radially between one of the hydraulic cylinders and the center of the brake assembly, each of said torque-taking members having a radially inner portion which is directly fastened to a non-rotating member so that none of the braking torque is transmitted through said backing plate, each of said torque-taking members having angularly-spaced ends provided with projections which extend outwardly to "straddle" the respective hydraulic cylinder and provide anchoring surfaces for the ends of the shoes, and return springs which act on the shoes to tend to hold them in engagement with the anchoring surfaces.

6. A brake, for use in cooperation with a rotatable drum, comprising a backing plate, two oppositely-disposed brake shoes mounted on the outer portion of the backing plate, two hydraulic cylinders secured to the outer portion of the backing plate and located between the ends of the shoes, each of said cylinders having a pair of pistons reciprocable therein, said pistons being in operative engagement with the adjacent ends of the shoes, two oppositely-disposed torque-taking members, each located radially between one of the hydraulic cylinders and the center of the brake asembly, each of said torque-taking members being directly fastened to a nonrotating member whereby torque is transmitted thereto in a manner by-passing said backing plate, each of said torque-taking members having angularly-spaced ends provided with projections which extend radially outwardly from the center portion of said backing plate to "straddle" the respective hydraulic cylinder and provide anchoring surfaces for the ends of the shoes, and return springs which act on the shoes to tend to hold them in engagement with the anchoring surfaces.

7. A brake comprising a backing plate, two brake shoes mounted on the backing plate, two hydraulic cylinders secured to the backing plate and located between the ends of the shoes, each of said cylinders having a pair of pistons reciprocable therein, said pistons being in operative engagement with the adjacent ends of the shoes, two torque-taking members substantially coplanar with the axis of said hydraulic cylinders, each located radially between one of the hydraulic cylinders and the center of the brake assembly, each of said torque-taking members having angularly-spaced ends provided with projections which extend radially to provide anchoring surfaces for the ends of the shoes, one projection of each torque-taking member having a threaded opening therein and the other projection of each torque-taking member having a subsantially radial slot formed therein, two adjusting screws having stems screwed into the respective threaded oepnings and having heads which provide anchoring and locating surfaces for the adjacent ends of the respective shoes, and two plano-convex thrust member lying in the respective radial slots and having straight surfaces which engage the bottoms of the slots and convex surfaces which engage complementary recesses in the adjacent ends of the respective shoes.

8. A brake comprising a backing plate, two brake shoes mounted on the backing plate, two hydraulic cylinders secured to the backing plate and located between the ends of the shoes, each of said cylinders having a pair of pistons reciprocable therein, said pistons being in operative engagement with the adjacent ends of the shoes, and two torque-taking members having radially inner portions, each located radially between one of the hydraulic cylinders and the center of the brake assembly, each radially inner portion being attached to a non-rotatable torque-taking member independently of said backing plate each of said torque-taking members having angularly-spaced ends provided with projections which extend outwardly to provide anchoring surfaces for the ends of the shoes.

9. A brake comprising a backing plate, two brake shoes mounted on the backing plate, two hydraulic cylinders secured to the backing plate and located between the ends of the shoes, each of said cylinders having a pair of pistons reciprocable therein, said pistons being in operative engagement with the adjacent ends of the shoes, two torque-taking members having radially inner portions, each located radially between one of the hydraulic cylinders and the center of the brake assembly, each of the inner portions of said torque-taking members being fastened to a non-rotatable means independently of said backing plate each of said torque-taking members having angularly-spaced ends provided with projections which extend outwardly to provide anchoring surfaces for the ends of the shoes, one projection of each torque-taking member having a threaded opening therein, and two adjusting screws having stems screwed into the respective threaded openings and having heads which provide anchoring and locating surfaces for the adjacent ends of the respective shoes.

10. A brake, for use in cooperation with a rotatable drum, comprising a backing plate having a center portion and an axially offset outer portion, two oppositely-disposed brake shoes mounted on the outer portion of the backing plate, two hydraulic cylinders secured to the outer portion of the backing plate and located between the ends of the shoes, each of said cylinders having a pair of pistons reciprocable therein, said pistons being in operative engagement with the adjacent ends of the shoes, two oppositely-disposed torque-taking members, each located radially between one of the hydraulic cylinders and the center of the brake assembly, each of said torque-taking members having a radially inner portion which lies against the center portion of the backing plate, the inner portion of each torque-taking member and the center portion of the backing plate having a plurality of aligned mounting holes by means of which the torque-taking members and the backing plate may be jointly secured to a non-rotating member, each of said torque-taking members having angularly-spaced ends equipped with projections which extend outwardly to "straddle" the respective hydraulic cylinder and provide anchoring surfaces for the ends of the shoes, and return springs which act on the shoes to tend to hold them in engagement with the anchoring surfaces.

11. A brake, for use in cooperation with a rotatable drum, comprising a backing plate having a center portion and an axially offset outer portion, two oppositely-disposed brake shoes mounted on the outer portion of the backing plate, two hydraulic cylinders secured to the outer portion of the backing plate and located between the ends of the shoes, each of said cylinders having a pair of pistons reciprocable therein, said pistons being in operative engagement with the adjacent ends of the shoes, two oppositely-disposed torque-taking members, each located radially between one of the hydraulic cylinders and the center of the brake assembly, each of said torque-taking members having a radially inner portion which lies against the center portion of the backing plate, the inner portion of each torque-taking member and the center portion of the backing plate having a plurality of aligned mounting holes by means of which the torque-taking members and the backing plate may be jointly secured to a non-rotating member, each of said torque-taking members having angularly-spaced ends equipped with projections which extend outwardly to "straddle" the respective hydraulic cylinder and provide anchoring surfaces for the ends of the shoes, and four return springs, one spring acting on each end of each shoe to urge it toward anchored position, two of the springs being arranged to exert a greater force on opposite ends of the two shoes than the other two springs exert on the other pair of opposite shoe ends.

12. For use in cooperation with a rotatable drum, a brake comprising a support member, a pair of oppositely-disposed brake shoes, two hydraulic cylinders carried by the outer portion of said support member and disposed between adjacent expansible ends of said shoes, and two substantially flat torque-taking forgings each having two radially outwardly extending projections which straddle the respective wheel cylinders and provide sliding and anchoring surfaces for adjacent expansible ends of said shoes, said forgings including a generally arcuate radially inner portion adapted to be directly connected to a non-rotatable member independently of said support member.

13. A brake comprising a pair of arcuate T section brake shoes, a backing plate, guide means having fixed abutments spaced axially from said backing plate and arranged to limit movement of the shoes in a lateral direction, a brake mounting member forming a part of the vehicle undercarriage, an anchoring member associated with each adjacent pair of shoe ends and formed of a continuous one-piece construction with a radially inward portion which lies against the radially inward portion of said backing plate, fastening means secured to said mounting member and extending axially for direct attachment with the radially inward portion of said anchoring members, said fastening means being also adapted for mounting the backing plate, two extension portions on each of said anchoring members, said extensions projecting radially outwardly to provide diverging anchoring surfaces at the ends thereof for the respective adjacent shoe ends which thrust thereagainst during brake operation, said diverging anchoring surfaces being located beyond the ends of said actuators and serving to cradle both said actuators and said shoes to provide vertical support for both of said shoes while permitting relative slidable movement thereon, and means for urging said shoe ends against the ends of said extensions to fix the retracted positions of said shoes.

14. In a brake according to claim 13, means associated with one end of each of said shoes to permit both pivotal and sliding movement of said shoe ends with respect to the anchoring member, said means including a plano-convex thrust member having a straight surface which engages the anchoring member and a convex surface which engages a complementary recess in the shoe end.

15. In a brake the combination of: two arcuate T section brake shoes arranged in end-to-end relation, a support plate, guide means having abutments spaced axially from said support plate to serve in locating said shoes in a lateral sense, a series of fastening means arranged about the inner periphery of said support plate to attach the brake to a vehicle undercarriage, an anchoring structure for each of the adjacent ends of said shoes, said anchoring structure comprising a forging which is arranged to lie against said support plate and is secured at the radially inner portion thereof to said fastening means, each of said anchoring structures having two integral projections which extend radially outward from their point of attachment with said fastening means to provide at the approximate end thereof two anchoring abutments which are combined with the respective adjacent shoe ends to provide anchoring surfaces which are radially outwardly displaced from the point of attachment of the anchoring structure with the vehicle undercarriage, and two actuators, one for each of the adjacent pairs of shoe ends, said actuators being carried by said support plate and straddled longitudinally by the projecting ends of the anchoring structures, said anchoring abutments being thereby located beyond the ends of said fluid actuators.

16. In a brake according to claim 15, an adjusting screw associated with one end of each of said shoes, said adjusting screws being threaded within the projections of said anchoring structures at approximate ends thereof to provide adjustable stops for one end of each shoe and thereby determining the retracted position thereof.

17. In a brake according to claim 16, a locking member carried by each of said anchoring abutments combined with a respective adjusting screw, said locking member being carried by the respective anchoring abutment and constructed to prevent accidental movement of said adjusting screw.

18. In a brake according to claim 15, a return spring arrangement in which resilient springs are stretched between each of the respective shoe ends and associated anchoring structures to develop a retracting force on said shoe ends to retain the shoe ends in normally engaged position with the projections of said anchoring structures, said return springs being arranged to develop the retracting force in a direction in general alignment with the retractile movement of said shoe ends.

19. A brake according to claim 15 in which said actuators comprise two fluid motors, each having oppositely-acting pistons, and thrust means provided between said pistons and the actuatable ends of said shoes, and means for mounting said fluid motors with the mounting located radially outward from the mounting of said anchoring structures.

20. In a brake according to claim 19, means for introducing fluid pressure to one of said fluid motors, and means interconnecting said fluid motors to transmit fluid pressure therebetween whereby both fluid motors are concurrently actuated.

References Cited in the file of this patent

UNITED STATES PATENTS

| | | |
|---|---|---|
| 1,870,296 | Schnell | Aug. 9, 1932 |
| 2,082,244 | Dick | June 1, 1937 |
| 2,365,715 | Mattersdorf | Dec. 26, 1944 |
| 2,475,491 | Goepfrich et al. | July 5, 1949 |
| 2,475,492 | Goepfrich et al. | July 5, 1949 |
| 2,496,562 | Schnell | Feb. 7, 1950 |
| 2,508,194 | Schnell | May 16, 1950 |
| 2,516,995 | House | Aug. 1, 1950 |
| 2,541,551 | Schnell | Feb. 13, 1951 |
| 2,544,030 | House | Mar. 6, 1951 |

FOREIGN PATENTS

| | | |
|---|---|---|
| 563,969 | Great Britain | Sept. 7, 1944 |

UNITED STATES PATENT OFFICE

CERTIFICATE OF CORRECTION

Patent No. 2,822,065            February 4, 1958

Rudolph A. Goepfrich et al.

It is hereby certified that error appears in the printed specification of the above numbered patent requiring correction and that the said Letters Patent should read as corrected below.

Column 4, line 50, for "torque-making" read -- torque-taking --; column 5, line 30, strike out "a", second occurrence.

Signed and sealed this 29th day of July 1958.

(SEAL)
Attest:

KARL H. AXLINE
Attesting Officer

ROBERT C. WATSON
Commissioner of Patents